(12) United States Patent
Dawson (10) Patent No.: US 11,230,175 B2
(45) Date of Patent: Jan. 25, 2022

(54) HAIL PROTECTIVE COVER

(71) Applicant: Lily Johnstone Dawson, Logan Village (AU)

(72) Inventor: Lily Johnstone Dawson, Logan Village (AU)

( * ) Notice: Subject to any disclaimer, the term of this patent is extended or adjusted under 35 U.S.C. 154(b) by 403 days.

(21) Appl. No.: 16/312,220

(22) PCT Filed: Jun. 21, 2017

(86) PCT No.: PCT/AU2017/050632
§ 371 (c)(1),
(2) Date: Dec. 20, 2018

(87) PCT Pub. No.: WO2017/219084
PCT Pub. Date: Dec. 28, 2017

(65) Prior Publication Data
US 2019/0202275 A1   Jul. 4, 2019

(30) Foreign Application Priority Data

Jun. 21, 2016  (AU) ................................ 2016902411

(51) Int. Cl.
*B60J 11/04*       (2006.01)
(52) U.S. Cl.
CPC ..................... *B60J 11/04* (2013.01)
(58) Field of Classification Search
CPC ....................................................... B60J 11/04
USPC ........................................................ 150/166
See application file for complete search history.

(56) References Cited

U.S. PATENT DOCUMENTS

| 5,941,594 | A |   | 8/1999 | O'Neill |
| 6,044,881 | A | * | 4/2000 | Welch ................. B60J 11/00 150/166 |
| 6,439,644 | B1 |   | 8/2002 | Jester |
| 7,360,820 | B2 |   | 4/2008 | Tellez |

(Continued)

FOREIGN PATENT DOCUMENTS

| AT | 404701 B | * | 2/1999 |
| AT | 404701 B | * | 2/1999 |

(Continued)

*Primary Examiner* — Sue A Weaver (57) ABSTRACT

A protective cover (10) for a motor car (11) comprises inner (12) and outer (13) cover portions connected together at a periphery (14). Elongate, substantially parallel, flexible webs (15) have long edges secured to the cover portions (12, 13) and are disposed in spaced rows transverse the vehicle (11) axis. Particular rows are located at (16), the change of section between the bonnet (17) and the windscreen (20), at (21) spaced adjacent each side of the change of section between the windscreen (20) and the turret roof (21), and at interrupted row (22) allowing for additional inflated thickness at the wing mirrors (23). Intermediate rows (24) are located at gradual changes of section. Webs (15) in the rows are spaced by spaces (18). An air supply assembly (25) comprises an axial fan (26) and motor (30) in a ducted housing (27), controller assembly (32), fly lead (33) and plug (34). The controller assembly (32) includes a wireless receiver paired to a remote fob (not shown) operable to power the fan for forward and reverse. An adjustable strap assembly (35) is provided for each wheel (36) of the vehicle (11) to secure the cover to the vehicle.

16 Claims, 6 Drawing Sheets

(56) References Cited

U.S. PATENT DOCUMENTS

| | | | |
|---|---|---|---|
| 7,640,698 B2* | 1/2010 | Graham | E04H 15/06 52/2.17 |
| 2002/0105207 A1* | 8/2002 | McGrath, Jr. | B64F 1/005 296/136.1 |
| 2007/0284023 A1 | 12/2007 | Sitarz | |
| 2010/0096052 A1 | 4/2010 | Graham | |
| 2010/0237671 A1* | 9/2010 | Danziger | B60N 2/2812 297/219.12 |
| 2012/0154911 A1* | 6/2012 | Huynh | B60R 1/06 359/511 |
| 2012/0318416 A1* | 12/2012 | Siciliano | B60J 11/04 150/166 |
| 2014/0015274 A1* | 1/2014 | Banda | B60J 11/04 296/136.02 |
| 2014/0083579 A1* | 3/2014 | White | A44B 99/00 150/154 |
| 2014/0312647 A1* | 10/2014 | Wang | B60J 11/04 296/136.02 |

FOREIGN PATENT DOCUMENTS

| | | |
|---|---|---|
| AU | 591015 B2 | 11/1989 |
| CN | 2710950 Y | 7/2005 |

\* cited by examiner

HAIL PROTECTIVE COVER

FIELD OF THE INVENTION

This invention relates to a hail protective cover. This invention has particular application to a hail protective cover for automobiles, and for illustrative purposes the invention will be described with reference to this application. However, we envisage that this invention may find use in other applications such as protecting both vehicles generally and fixed installations.

BACKGROUND OF THE INVENTION

The reference to any prior art in this specification is not, and should not be taken as, an acknowledgement or any form of suggestion that the referenced prior art forms part of the common general knowledge.

A vehicle parked outside is exposed to the elements and is generally resistant. However, hail may cause damage, as may missiles impelled by strong winds. Car covers of the kind adapted to protect the vehicle from sun and rain generally conform in contact with the vehicle. Inflatable vehicle covers of the prior art have specific problems to overcome.

Various prior art devices purport to offer some protection from hail. U.S. Patent Publication 2010/0096052, describes an "inflatable bladder" vehicle covering wherein the bladder is inflated to a static inflated state. "Inflatable protective covers" of U.S. Patent Publication 2007/0284023, provides static, sealed, covers inflated to a thickness of one to three inches. U.S. Pat. No. 7,360,820 describes apparatus with an inflatable airway chamber sealed after inflation. In U.S. Pat. No. 5,941,594 a structure including a number of thin inflatable bags is described. The bags are designed to be inflated and sealed in the inflated state.

The inherent problems of devices that are sealed when inflated include but not limited to susceptibility to failure by leakage.

In U.S. Pat. No. 6,439,644 discloses apparatus for protecting a vehicle from falling hail during a hail storm, comprising a cover defined by an inner surface and an outer surface and having the general shape of the vehicle, the surfaces defining an air chamber. A blower constantly supplies air into the air chamber during a hail storm for maintaining the air chamber at a thickness in the range of about 5.5 to 6.5 inches. Pressure relief means and securing means also feature.

This example suffers from a fundamental defect in that the flexible inner and outer surface portions of the disclosed cover are not likely to maintain about 5.5 to 6.5 inches of cover by inflation protected by pressure relief means alone, and will overinflate at the pressures indicated in the description of the preferred embodiment.

US Patent Application Publication No. US 2012/0318416 A1 discloses inflatable covering apparatus comprising a double-layer shroud having an inner layer and an outer layer connected at their peripheries. The outer layer is larger in area than the inner layer to define an inflatable chamber there between. The shroud has a drawstring assembly encircling the shroud periphery to secure the shroud to the vehicle. The shroud has at least one blower port integrated into the shroud and at least one blower assembly for inflating the shroud. A remote control module is operably coupled to the blower(s) and operable by a remote control.

This apparatus again will require inflation to a significant volume over that required to provide protection in order to provide sufficient skin tension. The drawstring system is prone to failure in high winds.

SUMMARY OF THE INVENTION

In one aspect, the present invention resides broadly in a hail protective cover including:
a flexible cover member shaped to fit over an article to be protected and including an inner cover portion and an outer cover portion, said inner and outer cover portions being sealingly conjoined at their respective peripheries to form a cover periphery;
a plurality of elongate, substantially parallel, flexible webs secured in both a lengthwise and lateral spaced relation by a respective long edge to abutting surfaces of said inner and outer cover portions, the plurality of spaces between ends of adjacent said flexible webs forming with said inner and outer cover portions a contiguous inflatable space having an inflated thickness controlled by a selected transverse dimension of said webs;
an air supply selected to inflate and maintain said space in an inflated state; and
a plurality of discrete securing means spaced about said cover periphery and adapted to selectively engage said article to be protected.

The article to be covered may comprise a motor car, and the invention is described hereinafter with reference to this application. The flexible cover member may be shaped to fit over a car by any means dictated by the material chosen for the inner and outer cover portions. For example, a sheet mouldable material such as PVC may be moulded to shape. A prestretched fabric construction may be tailored.

The inner and outer cover portions may be of the same or different material. The outer cover portion may be UV resistant. Preferably the material comprising the inner cover portion and the outer cover portion is a lightweight, low volume, low stretch material. For example, polyester woven materials formed from prestretched yarns may be used. The woven materials may be coated or otherwise treated to reduce moisture transmission. Preferably the inner cover portion and the outer cover portion are each formed of a polyester woven material of less than 200 $gm^{-2}$ to form a lightweight, low volume cover that can be stuffed into a storage bag.

The inner and outer cover portions may sealingly conjoined at their respective peripheries to form a cover periphery by any suitable means. For example, a PVC cover member may be thermally welded or glued. A woven polyester cover may be stitched and/or glued. The periphery may incorporate or be bound by a reinforcing tape, bolt rope or the like.

The plurality of elongate, substantially parallel, flexible webs may be formed of the same or different material to either one or both of the inner and outer cover portions. The long edges of the webs may be secured to the inner and outer cover portions by any means known to be useful for the material. In the case of woven polyester inner and outer cover portions, the webs are preferably sewn in, with or without additional bonding.

In the example of a car cover, the webs may be disposed with the elongate edges transverse the vehicle centreline. This is advantageous given the bilateral symmetry of a vehicle, whereby the webs may be located relative to changes in vehicle section in order to maximize the protective effect.

The number, and lengthwise (end to end) and laterally spaced relation, of the webs may be empirically optimised having regard to variables such as the peak pressure capability of the air supply and the shape of the cover. A useful rule of thumb for a vehicle, for example, is to dispose spaced rows of webs transverse a vehicle axis of symmetry, with a row either located at a significant change of vehicle cross section, or a pair of rows spaced adjacent each side or the change of section. Gradual changes of section may be divided by rows at locations selected to avoid over inflation of the cover member.

The spacing of webs in the rows may usefully be minimised having regard to allowing free equalization of air pressure in the contiguous space. The spacing may be modified to account for the presence of, for example, wing mirrors and other protrusions.

The inflated thickness is controlled by the transverse dimension of said webs to any selected thickness, having regard to the available inflation pressure and volume, and the expected impacts. For example, the webs may practically be selected from 50-250 mm in the transverse direction (of the web), more typically 50 mm to 150 mm.

The air supply may suitably comprise a fan or blower, but may comprise a compressed air supply. The air supply may comprise a positive displacement pump, in which case the cover member is preferably provided with pressure relief means. Alternatively, the air supply may deliver atmospheric air via an axial or centrifugal fan or blower. A fan or blower may be integrated with the cover member or may be external to it and connected by a hose.

The axial or centrifugal fan or blower may cooperate with pressure relief means to prevent over inflation of the cover member while maintaining the cover member in its inflated state. Alternatively, the axial or centrifugal fan or blower may be selected to reach an inherent outlet pressure at which the turbine stalls. In a yet further embodiment, the inflated cover member may comprise pressure monitoring means adapted to operate the air supply to maintain the cover member within a range of inflated states.

The air supply may be powered by the article being protected. For example, the air supply may be powered by a vehicle battery. Alternatively, a separate battery may be used. For an automotive car cover, it is anticipated that a blower having a maximum draw of less than 4A at a nominal 12 VDC may be powered by, for example a 7AH sealed lead acid battery for over 30 minutes.

As access to the power connections is limited when the cover member is installed and inflated, the air supply may be associated with remote control means. The remote control means may be selected from wired, wireless radio or infrared remote control means.

The remote control means may be selected from fob operated wireless remote controls. For example, the remote control may be a two- or more-button remote control fob securely paired with a receiver/motor controller for the fan or blower. Preferably the remote control includes at least an on/off function and a blow (forward rotation)/vacuum (reverse rotation) function. The remote controlled receiver/motor controller may include features such as electronic switching delay protecting the transition between forward and reverse rotation from excessive braking current. The remote fob may include LED indicators such as for "Power", "Forward" and "Reverse".

The air supply means may comprise an air supply assembly secured to the cover member and comprising an electric fan or blower in a housing and an integrated control assembly including switching control for the fan or blower, a remote control receiver controlling the switching control, and an electrical supply tail. The electrical supply tail may comprise terminal spring (alligator) clips for connection to a vehicle battery, a cigar or accessories socket-compatible plug or the like. In one embodiment, the vehicle may be fitted off with a special connection to the battery that may be led outside the vehicle to engage the supply tail by suitable complementary means such as an ANDERSON™ plug.

The plurality of discrete securing means may take any suitable form. Unlike a drawstring or the like, discrete securing means spaced about the cover periphery may be optimised to secure to the article at the respective point. A drawstring is less secure against a sheer surface and more secure beneath an overhang. Given enough sheer surface, the cover may be lifted off the article, unless drawn very tight.

In the case of motor vehicles, the securing means may comprise an adjustable strap having a fixed end secured to a reinforced edge of the cover member periphery, and a free end equipped with one of a snap hook and ring, the other of the snap hook and ring being secured to the reinforced edge spaced from the fixed end. An adjustable strap may be provided adjacent each wheel of the covered vehicle. In use, the adjustable strap may be passed behind its respective wheel, snapped to its ring and adjusted for tightness. To avoid the need to pass the strap behind the wheel while lying on the ground, the apparatus may be provided with an accessory extension of the user's arm, such as a stiff wire having a first end adapted to hold the free end of the strap and a second end portion functioning as a handle. In use, the user need only bend down to pass the strap behind the wheel.

BRIEF DESCRIPTION OF THE DRAWINGS

The invention will be described with reference to the following non-limiting embodiment of the invention as illustrated in the drawings and wherein.

In the figures, there is provided a hail protective cover 10 adapted to cover a motor car 11. The cover 10 comprises inner 12 and outer 13 cover portions of polyester woven material. The material has 60 threads per centimeter (tpc) warp and 29.8 tpc weft, for a fabric weight of 118 g/m$^2$. The warp yarn is 83.7 denier and the weft yarn is 170 denier, both being continuous filament microfiber formed into a fabric with an emerised finish and a light acrylic coating on one side.

The polyester cover portions 12, 13 are stitched and glued together at the periphery 14. The periphery 14 incorporates a reinforcing tape.

A plurality of elongate, substantially parallel, flexible webs 15 are formed of the same material as the cover portions 12, 13. Long edges of the webs 15 are secured to the inner and outer cover portions 12, 13 bonding and oversewing. The webs 15 are disposed in spaced rows transverse the vehicle 11 axis of symmetry. A particular row 16 is located at the change of section between the bonnet 17 and the windscreen 20. Webs 15 in the rows are spaced by spaces 18. A pair of rows 21 are spaced adjacent each side of the change of section between the windscreen 20 and the turret roof 21. An interrupted row 22 allows for additional inflated thickness at the wing mirrors 23. Intermediate rows 24 are located at gradual changes of section to avoid over inflation of the cover member 10.

The inflated thickness is controlled by the transverse dimension of the webs 15, in this case to a finished dimension between the cover portions 12, 13 of 100 mm. the spaces between the webs 15 in a row are empirically selected to maintain the shape of the outer cover portion 13 and allowing free distribution of inflation air between the covers 12, 13.

Figure 6:
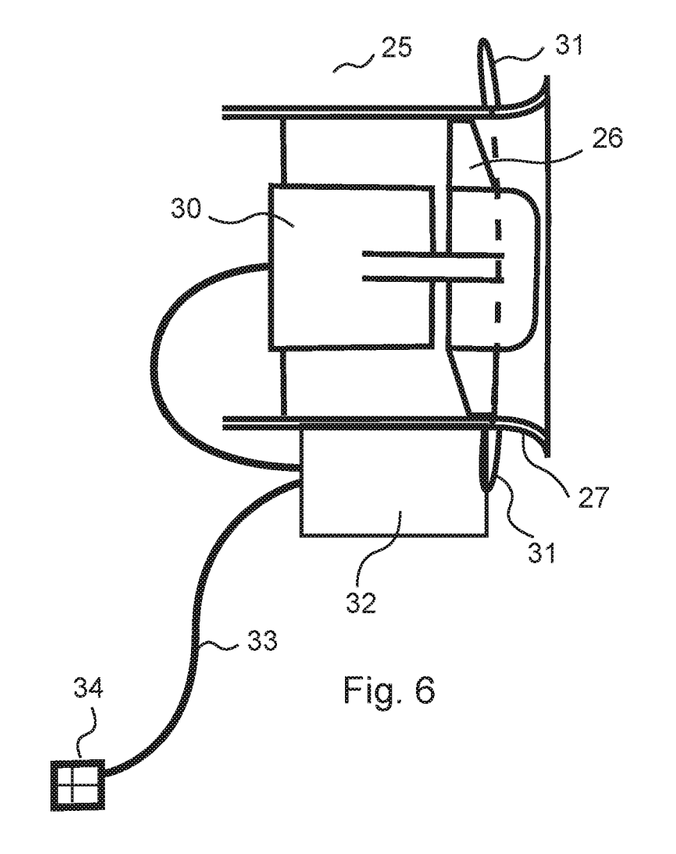
FIGS. 6 and 7 are side sectional and end views respectively of inflation means for use in the apparatus of FIG. 1.
Figure 7:
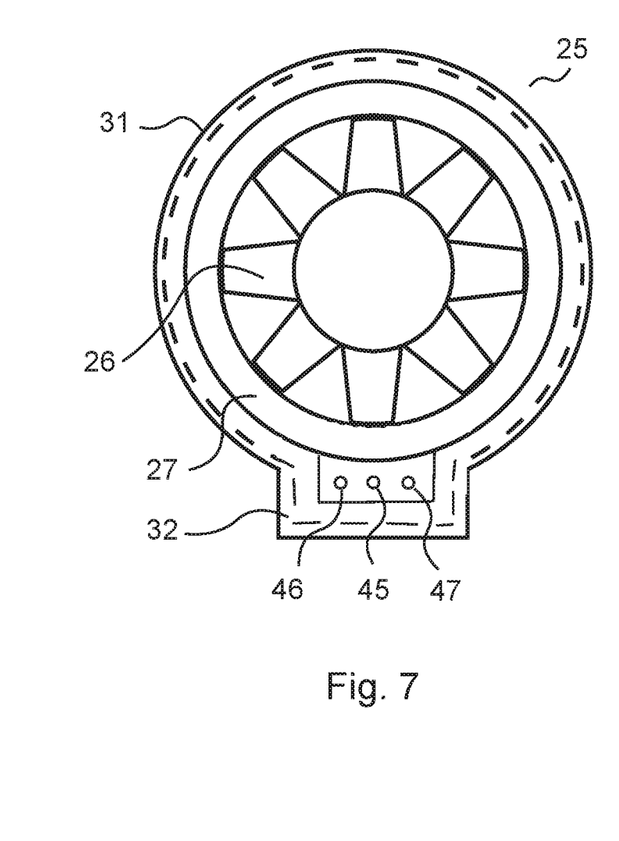

An air supply assembly 25 comprises an axial fan 26 mounted for driven rotation in a ducted housing 27 by a DC electric motor 30. The ducted housing 27 has an annular external mounting flange 31 sealingly secured to the outer cover portion 13. A controller assembly 32 reversibly controls the operation of the motor by switching of the vehicle power supply to the motor 30 via fly lead 33 and ANDERSON™ plug 34.

The controller assembly 32 includes a wireless remote control receiver paired to a remote fob (not shown) and operable to remotely effect the selective switching of the vehicle power supply to the motor 30. In this example, the controller assembly 32 includes a motor driver comprising a 4A H-bridge controller chip which allows safe forward/reverse/stop operation of the DC electric motor 30. The controller chip responds to control signals from the receiver. The receiver comprises circuitry and programming to securely pair with the fob, and interfaces with an ATMEL 328 processor to enable and power the fan for forward and reverse as selected by the fob, indicate a "power on state by LED 45, indicate operation "forward" or "reverse" by respective LEDs 46 and 47, and provide a suitable delay between forward and reverse operation to prevent strain on the internal motor wiring.

Figure 1:
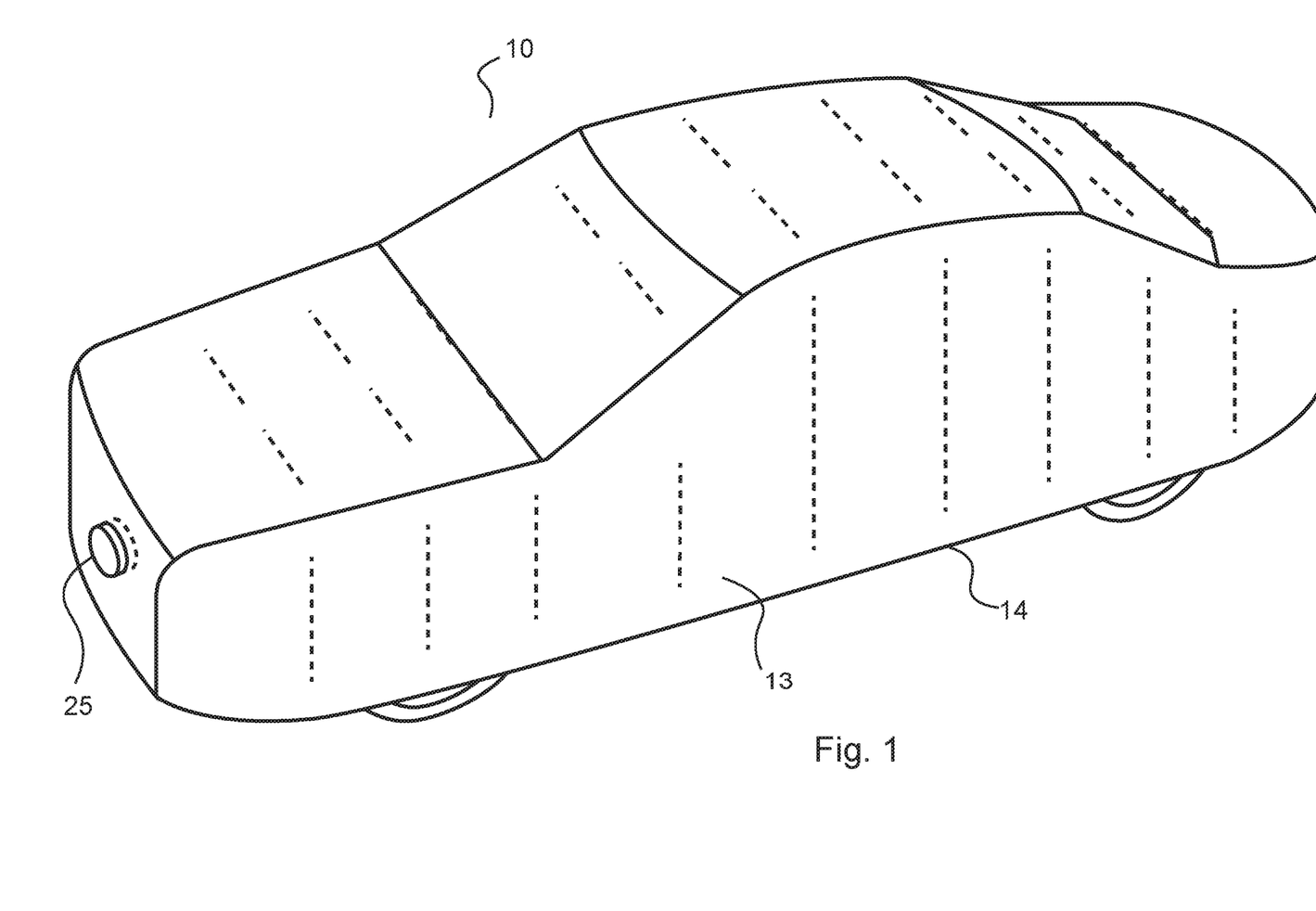
FIG. 1 is an isometric view of apparatus in accordance with the present invention, in use.
Figure 2:
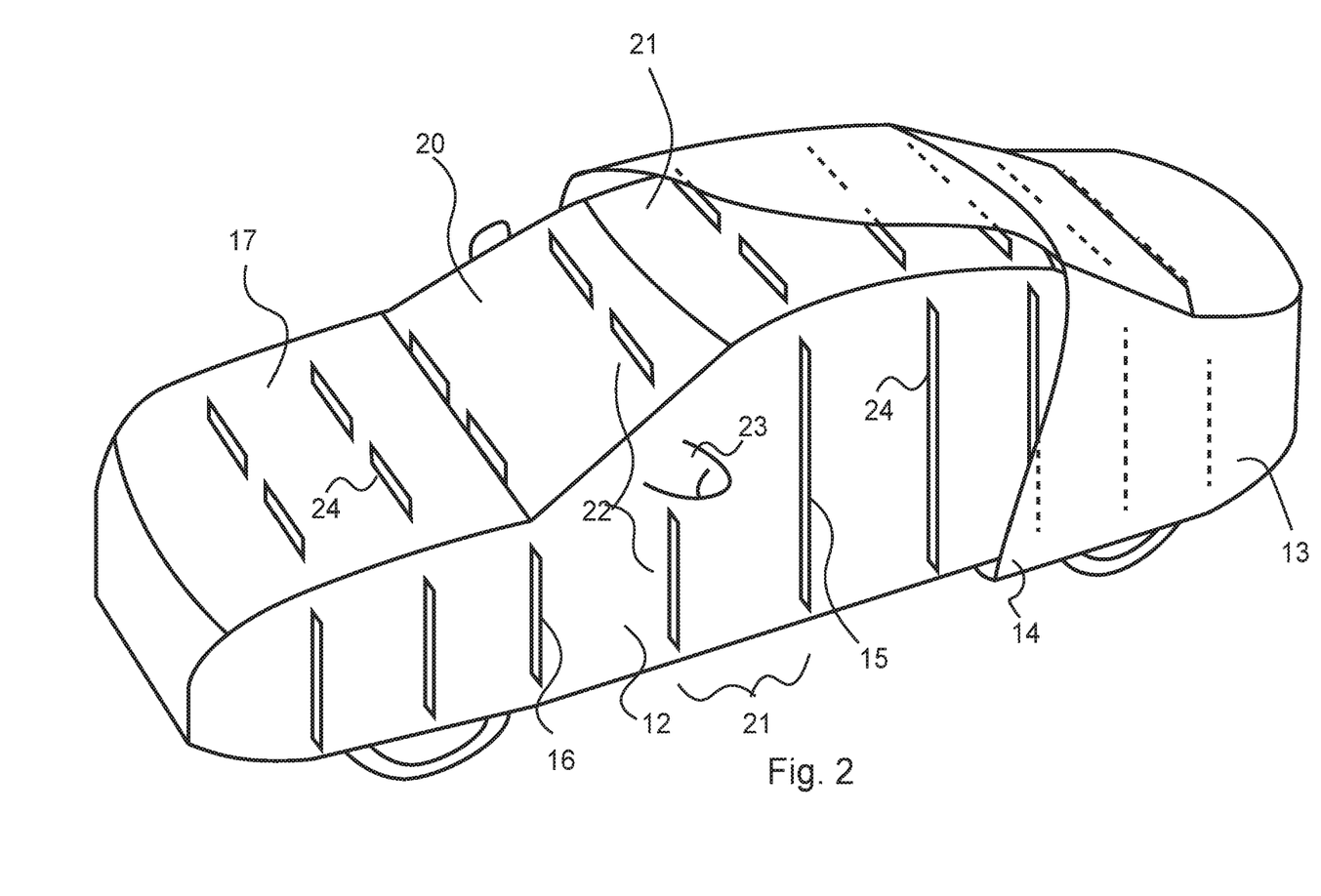
FIG. 2 is a partially cut away isometric view of the apparatus of FIG. 1.
Figure 3:
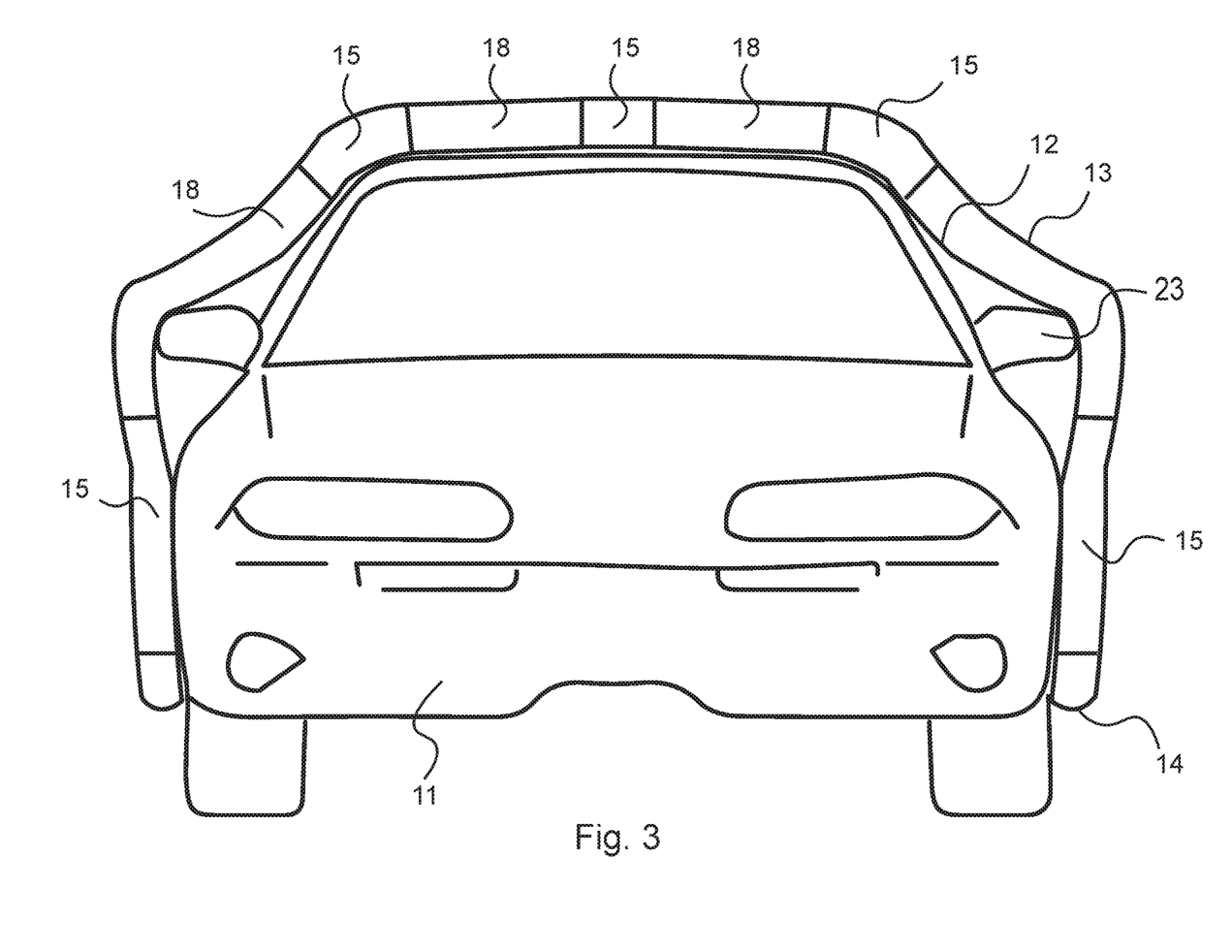
FIG. 3 is a front view of the apparatus of FIG. 1 in use, transversely sectioned.
Figure 4:
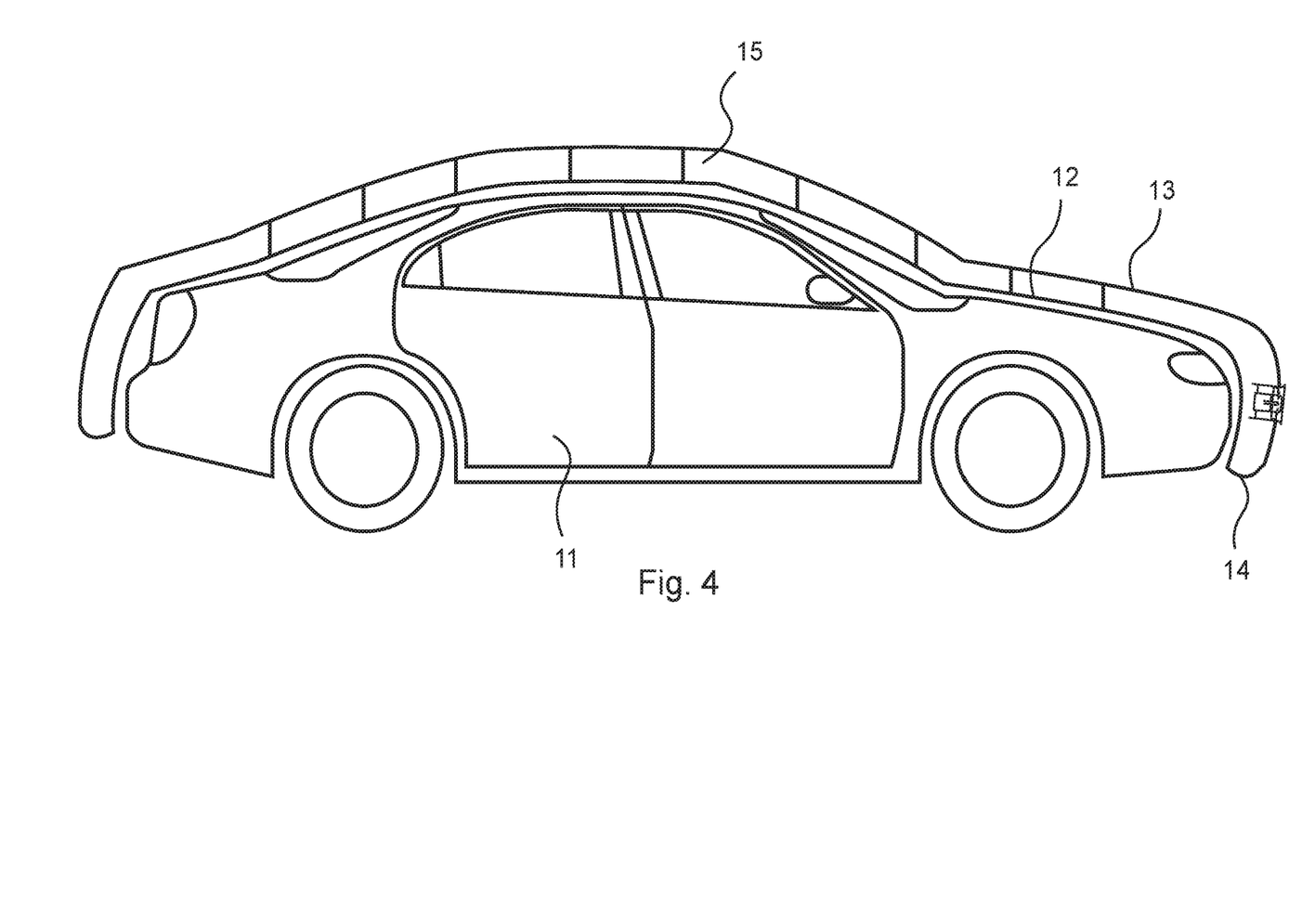
FIG. 4 is a side view of the apparatus of FIG. 1 in use, longitudinally sectioned.
Figure 5:
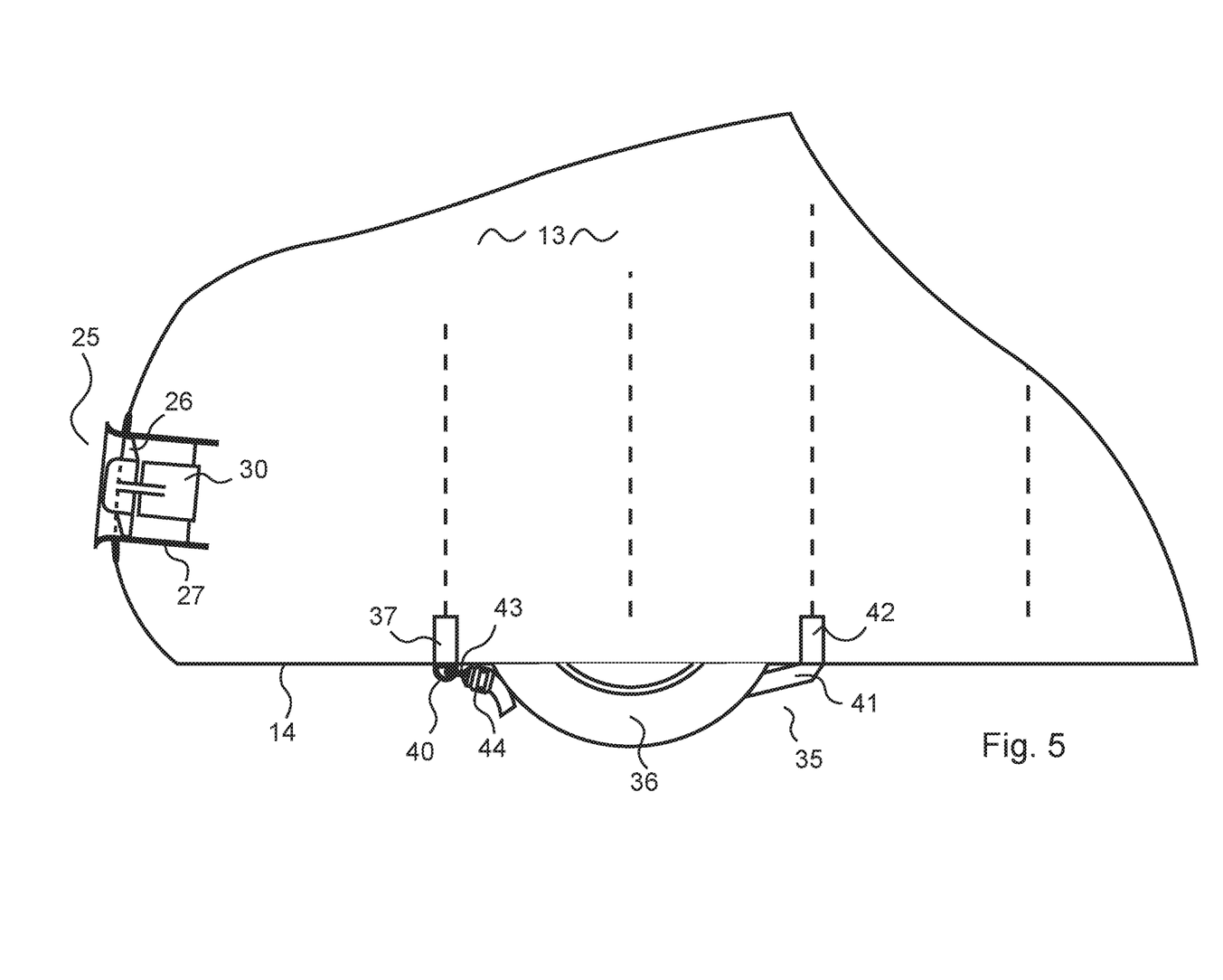
FIG. 5 is a partial side view of the front portion of the apparatus of FIG. 1 in use, showing inflation means and securing means details.

Discrete securing means in the form of an adjustable strap assembly 35 is provided for each wheel 36 of the vehicle 11. The adjustable strap assembly 35 has a fixed end 37 secured to the reinforced edge of the cover member periphery 14 and including a metal ring 40. The adjustable strap assembly 35 further comprises an adjustable strap portion 41 secured at 42 to the reinforced edge of the cover member periphery 14 in spaced relation to the fixed end 37. The free end of the strap portion 41 includes a snap hook 43 adapted to selectively engage the ring 40, and an adjuster buckle 44.

In use, the adjustable strap portion 41 is passed behind its respective wheel 36, the snap hook 43 snapped to its ring 40 and the buckle 44 adjusted for tightness.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:

1. A hail protective vehicle cover including:
   a flexible cover member shaped to fit in an operating position over a vehicle and including an inner cover portion and an outer cover portion, said inner and outer cover portions being sealingly conjoined at their respective peripheries to form a cover periphery, wherein when the flexible cover member is in the operating position over the vehicle a first axis of the flexible cover member extends parallel to the vehicle axis of symmetry and a second axis of the flexible cover member extends transverse to the vehicle axis of symmetry;
   a plurality of elongate, substantially parallel, flexible webs arranged in rows, said webs secured in lengthwise spaced relation by a respective long edge to abutting surfaces of said inner and outer cover portions, said rows being spaced apart both along the first axis of the flexible cover member and the second axis of the flexible cover member to form a plurality of spaces between ends of adjacent said flexible webs, the plurality of spaces between ends of adjacent said flexible webs forming with said inner and outer cover portions a contiguous inflatable space having an inflated thickness controlled by the transverse dimension of said webs;
   an electric blower integral with the flexible cover member and selected to inflate said inflatable space and maintain said inflatable space in an inflated state; and
   a plurality of discrete securing means spaced about said cover periphery and adapted to selectively engage said vehicle when the flexible cover member is in the operating position over the vehicle.

2. The hail protective vehicle cover of claim 1 wherein the inner and outer cover portions are of polyester woven material.

3. The hail protective vehicle cover of claim 2 wherein the polyester woven material is of less than 200 grams per square meter.

4. The hail protective vehicle cover of claim 2 wherein the inner and outer cover portions are sealingly conjoined by stitching or gluing, or both stitching and gluing at their respective peripheries with a reinforcing tape to form athe cover periphery.

5. The hail protective vehicle cover of claim 1 wherein the plurality of elongate, substantially parallel, flexible webs are formed of the same material to either one or both of the inner and outer cover portions.

6. The hail protective vehicle cover of claim 5 wherein the inner and outer cover portions are of polyester woven material, the webs are of polyester woven material, and the long edges of the webs are secured to the inner and outer cover portions by sewing in.

7. The hail protective vehicle cover of claim 1 wherein when the flexible cover member is in the operating position over the vehicle, the webs are disposed with the elongate edges transverse the vehicle centerline.

8. The hail protective vehicle cover of claim 7 wherein when the flexible cover member is in the operating position over the vehicle, spaced rows of said webs are disposed transverse the vehicle axis of symmetry, with a row either located at a significant change of vehicle cross section, or a pair of rows spaced adjacent each side of the significant change of vehicle cross section.

9. The hail protective vehicle cover of claim 8 wherein a spacing of webs in the rows is minimized having regard to allowing free equalization of air pressure in the contiguous inflatable space.

10. The hail protective vehicle cover of claim 1 wherein the dimension of said webs transverse said long edges is selected from 50-250mm.

11. The hail protective vehicle cover of claim 10 wherein the dimension is from 50 mm to 150 mm.

12. The hail protective vehicle cover of claim 1 wherein the electric blower comprises an axial or centrifugal blower.

13. The hail protective vehicle cover of claim 1 wherein the electric blower is powered by a battery of the vehicle.

14. The hail protective vehicle cover of claim 13 wherein the electric blower is associated with remote control means selected from wired, wireless radio or infrared remote control means.

15. The hail protective vehicle cover of claim 14 wherein the electric blower includes an integrated control assembly including switching control for the electric blower, a remote control receiver controlling the switching control, and an electrical supply tail adapted for connection to the battery of the vehicle via, a cigar or accessories socket-compatible plug.

16. The hail protective vehicle cover of claim 1 wherein each discrete securing means comprises an adjustable strap associated with a respective vehicle wheel, the adjustable strap having a fixed end secured to a reinforced edge of the cover periphery, and a free end equipped with a first part of a snap hook and ring, with a second part of the snap hook and ring being secured to the reinforced edge of the cover periphery spaced from the fixed end whereby in use the adjustable strap is adapted to be extended behind its respective wheel, snapped to its ring, and adjusted for tightness.

\* \* \* \* \*